United States Patent
Hsu et al.

(10) Patent No.: US 9,753,620 B2
(45) Date of Patent: Sep. 5, 2017

(54) METHOD, SYSTEM AND COMPUTER PROGRAM PRODUCT FOR FACILITATING THE PROTOTYPING AND PREVIEWING OF DYNAMIC INTERACTIVE GRAPHICAL DESIGN WIDGET STATE TRANSITIONS IN AN INTERACTIVE DOCUMENTATION ENVIRONMENT

(71) Applicant: Axure Software Solutions, Inc., San Diego, CA (US)

(72) Inventors: Victor Hsu, San Diego, CA (US); Martin Smith, San Diego, CA (US); Ben Fraser, Encinitas, CA (US)

(73) Assignee: Axure Software Solutions, Inc., San Diego, CA (US)

( * ) Notice: Subject to any disclaimer, the term of this patent is extended or adjusted under 35 U.S.C. 154(b) by 30 days.

(21) Appl. No.: 14/449,472

(22) Filed: Aug. 1, 2014

(65) Prior Publication Data
US 2016/0034144 A1    Feb. 4, 2016

(51) Int. Cl.
*G06F 3/048* (2013.01)
*G06F 3/00* (2006.01)
(Continued)

(52) U.S. Cl.
CPC ........ *G06F 3/04842* (2013.01); *G06F 3/0485* (2013.01); *G06F 3/04845* (2013.01); *G06F 2203/04806* (2013.01)

(58) Field of Classification Search
CPC . G06F 3/048; G06F 9/44; G06F 17/00; G06F 3/00; G06F 15/16; G06F 17/30; G06F 8/00
(Continued)

(56) References Cited

U.S. PATENT DOCUMENTS 5,335,342 A * 8/1994 Pope et al. ................ 714/38.13
5,459,832 A   10/1995 Wolf et al.
(Continued)

FOREIGN PATENT DOCUMENTS

DE   102006011374 A1   9/2007
EP       1300760 A2    4/2003
(Continued)

OTHER PUBLICATIONS

David A Edson, Microsoft Office Visio 2007 Tips and Tricks Documentation, 2008, pp. 1-67.*
(Continued)

*Primary Examiner* — Jennifer To
*Assistant Examiner* — Hugo Molina
(74) *Attorney, Agent, or Firm* — The Mueller Law Office, P.C.

(57) ABSTRACT

Various methods and systems for documenting interactive graphical design are provided. An exemplary graphical design environment stored on a non-transitory computer-readable medium comprises a documentation element in an interactive graphical design. The design environment also comprises a design element that displays a plurality of states in a rendering of the interactive graphical design in an external player. The documentation element: (i) is enabled to receive a selection from the user of a state in the plurality of states; and (ii) displays a representation of the design element in the state in response to receiving the selection from the user. The documentation element and design element are both instantiated by a processor operating in combination with the non-transitory computer-readable medium.

17 Claims, 11 Drawing Sheets

(51) Int. Cl.
  *G06F 17/30* (2006.01)
  *G06F 17/00* (2006.01)
  *G06F 3/0484* (2013.01)
  *G06F 3/0485* (2013.01)

(58) Field of Classification Search
  USPC .................................................. 715/763
  See application file for complete search history.

(56) References Cited

U.S. PATENT DOCUMENTS

| | | | |
|---|---|---|---|
| 5,499,330 A | 3/1996 | Lucas et al. | |
| 6,011,537 A | 1/2000 | Slotznick | |
| 6,151,610 A | 11/2000 | Senn et al. | |
| 6,237,138 B1* | 5/2001 | Hameluck et al. | 717/128 |
| 6,539,406 B1 | 3/2003 | Ibarra et al. | |
| 6,751,620 B2 | 6/2004 | Orbanes et al. | |
| 6,792,475 B1 | 9/2004 | Arcuri et al. | |
| 6,904,397 B1* | 6/2005 | Fields | G01R 31/318314 703/14 |
| 6,938,031 B1* | 8/2005 | Zoltan et al. | 707/771 |
| 6,993,720 B1* | 1/2006 | Hanoch et al. | 715/708 |
| 7,047,487 B1 | 5/2006 | Bates et al. | |
| 7,050,955 B1 | 5/2006 | Carmel et al. | |
| 7,065,705 B1 | 6/2006 | Wang et al. | |
| 7,110,936 B2* | 9/2006 | Hiew et al. | 703/22 |
| 7,114,149 B2* | 9/2006 | Aptus | G06F 8/20 715/209 |
| 7,143,366 B1 | 11/2006 | McKelvey et al. | |
| 7,174,286 B2* | 2/2007 | Martin et al. | 703/22 |
| 7,262,782 B1 | 8/2007 | Parenteau et al. | |
| 7,310,781 B2 | 12/2007 | Chen et al. | |
| 7,426,687 B1 | 9/2008 | Schultz et al. | |
| 7,490,298 B2 | 2/2009 | Bauman et al. | |
| 7,495,675 B1 | 2/2009 | Bourdev et al. | |
| 7,519,573 B2 | 4/2009 | Helfman et al. | |
| 7,533,369 B2* | 5/2009 | Sundararajan et al. | 717/123 |
| 7,644,390 B2* | 1/2010 | Khodabandehloo et al. | 717/105 |
| 7,650,316 B2* | 1/2010 | Peck et al. | 706/11 |
| 7,681,112 B1 | 3/2010 | Francis | |
| 7,720,073 B2* | 5/2010 | Khan et al. | 370/395.21 |
| 7,752,575 B2 | 7/2010 | Anglin et al. | |
| 7,788,640 B2* | 8/2010 | Grimaldi | 717/123 |
| 8,103,701 B2* | 1/2012 | Brimble et al. | 707/803 |
| 8,104,107 B2* | 1/2012 | Jin | 4/448 |
| 8,130,238 B2 | 3/2012 | Distler | |
| 8,249,414 B2 | 8/2012 | Ackley et al. | |
| 8,291,331 B2 | 10/2012 | Dutta et al. | |
| 8,453,107 B2 | 5/2013 | Danton et al. | |
| 8,473,859 B2 | 6/2013 | Chaudhri et al. | |
| 8,484,561 B1* | 7/2013 | Lemonik et al. | 715/255 |
| 8,490,023 B2 | 7/2013 | Carteri et al. | |
| 8,533,580 B1 | 9/2013 | Xu | |
| 8,635,552 B1 | 1/2014 | Park et al. | |
| 8,683,312 B2 | 3/2014 | McAfee et al. | |
| 8,717,383 B2 | 5/2014 | Coldicott et al. | |
| 8,719,071 B2 | 5/2014 | MacIntyre et al. | |
| 8,719,758 B1 | 5/2014 | Knapp et al. | |
| 8,731,745 B2 | 5/2014 | Fisher et al. | |
| 8,739,123 B2 | 5/2014 | Appleton et al. | |
| 8,751,923 B2 | 6/2014 | Nagao | |
| 8,756,568 B2* | 6/2014 | Hale et al. | 717/123 |
| 2002/0075311 A1 | 6/2002 | Orbanes et al. | |
| 2002/0087950 A1* | 7/2002 | Brodeur et al. | 717/124 |
| 2002/0089541 A1 | 7/2002 | Orbanes et al. | |
| 2004/0143511 A1* | 7/2004 | Miller | G06F 3/04847 705/26.1 |
| 2004/0174397 A1 | 9/2004 | Cereghini et al. | |
| 2005/0197807 A1* | 9/2005 | Nelson | G06F 17/50 703/1 |
| 2005/0251757 A1* | 11/2005 | Farn | G06F 8/38 715/810 |
| 2006/0004733 A1* | 1/2006 | Zoltan | G06F 17/30864 |
| 2006/0005126 A1 | 1/2006 | Shapiro | |
| 2006/0036958 A1* | 2/2006 | Dreher | 715/764 |
| 2006/0143594 A1* | 6/2006 | Grimaldi | G06F 8/73 717/123 |
| 2007/0192745 A1* | 8/2007 | Fernandez | G06F 8/38 715/840 |
| 2007/0220497 A1* | 9/2007 | Chudukatil | G06F 8/71 717/140 |
| 2007/0266329 A1* | 11/2007 | Gaudette | 715/763 |
| 2008/0010591 A1 | 1/2008 | Good et al. | |
| 2008/0163109 A1* | 7/2008 | Srivatsan | G06F 3/0482 715/810 |
| 2008/0263153 A1* | 10/2008 | Reshef | G06F 17/3061 709/203 |
| 2009/0235186 A1* | 9/2009 | Howard | G06F 17/30905 715/760 |
| 2010/0058162 A1 | 3/2010 | Coldicott et al. | |
| 2010/0131482 A1 | 5/2010 | Linthicum et al. | |
| 2010/0255882 A1 | 10/2010 | Kozitsyn et al. | |
| 2010/0280819 A1* | 11/2010 | Ozkaragoz | G06F 17/289 704/9 |
| 2010/0293480 A1* | 11/2010 | Shivananda | G06F 8/73 715/760 |
| 2010/0309212 A1* | 12/2010 | Muir | 345/545 |
| 2011/0145741 A1* | 6/2011 | Das | A61B 6/00 715/764 |
| 2011/0170144 A1 | 7/2011 | Sankarasubramaniam et al. | |
| 2011/0185300 A1* | 7/2011 | Hinckley | G06F 3/03545 715/769 |
| 2012/0089542 A1* | 4/2012 | Hettel | 706/12 |
| 2012/0102458 A1* | 4/2012 | Meijer et al. | 717/123 |
| 2012/0144286 A1* | 6/2012 | Bank et al. | 715/230 |
| 2012/0191430 A1* | 7/2012 | Sarkar et al. | 703/6 |
| 2012/0278691 A1* | 11/2012 | Heiney | G06F 17/21 715/202 |
| 2012/0297298 A1* | 11/2012 | Dovey et al. | 715/273 |
| 2012/0304051 A1 | 11/2012 | Balakrishnan et al. | |
| 2013/0067302 A1 | 3/2013 | Chen et al. | |
| 2013/0069980 A1* | 3/2013 | Hartshorne | G09G 5/00 345/620 |
| 2013/0141428 A1 | 6/2013 | Gipson | |
| 2013/0232144 A1 | 9/2013 | Katsambas et al. | |
| 2014/0250392 A1* | 9/2014 | Riggins | H04N 21/8545 715/764 |

FOREIGN PATENT DOCUMENTS

| | | |
|---|---|---|
| WO | 2010030914 A2 | 3/2010 |
| WO | 2014086225 A1 | 6/2014 |

OTHER PUBLICATIONS

Microsoft Visio 2007 Training Courses, Linking data to diagrams, Dec. 28, 2013.*
Microsoft Visio 2010 Training Courses, Pan & Zoom in a Diagram, Jan. 28 2013.*
Li et al., Informal Prototyping of Continuous Graphical INteractions by Demonstration, Oct. 23-27, 2005, ACM 1-59593-023-X/05/0010, pp. 1-10.*
Carsten Owerfeldt, Enable using Qt Quick Components in QML graphical designer, Sep. 23, 2010, pp. 1-2.*
Adding Text Requirements, iRise, Accessed on Jul. 30, 2014, http://ww2.irise.com/support/tutorials/beginner/adding-text-re-quirements.
Creating Scenarios, Justinmind Prototyper, Accessed Jul. 1, 2014, http://www.justinmind.com/help/index.jsp?topic=/com.justinmind.prototyper.infocenter/html/creating_scenarios.html.
Documenting requirements in the simulation, iRise, Accessed Jul. 30, 2014, https://community.irise.com/irise/topics/documenting_requirements_in_the_simulation.
Exporting a Specification, Protoshare, Access on Jul. 1, 2014, https://community.protoshare.com/6-3/developer/using-protoshare/exporting-your-work/exporting-a-specification/.
How to export the simulation as a document with browser version screen shot, iRise, Accessed Jul. 30, 2014, https://community.irise.com/irise/topics/how_to_export_the_simulation_as_docu-ment_with_browser_version_screen_shot.

(56) References Cited

OTHER PUBLICATIONS

Interaction Prototyping, Indigo, Access Jul. 30, 2014, http://www.infragistics.com/products/indigo-studio/features/prototype-and-visualize-user-centered-interactions.
Page Thumbnails in Flow Diagram, Axure Forum, Axure, Inc., Accessed Jul. 1, 2014, http://www.axure.com/forum/feature-requests/4520-page-thumbnails-flow-diagram-screenshot-thumbnail-pages-wireframe.html.
Reports Customization, Justinmind Prototyper, Accesed Jul. 1, 2014, http://www.justinmind.com/help/index.jsp?topic=/com.justinmind.prototyper.infocenter/html/reports_customization.html.
The Documentation View of Design, IXDA, Accessed Jul. 30, 2014, http://www.ixda.org/node/16805.
International Search Report and Written Opinion dated Oct. 23, 2015 for PCT Patent Application No. PCT/US15/41776.

* cited by examiner

Figure 4
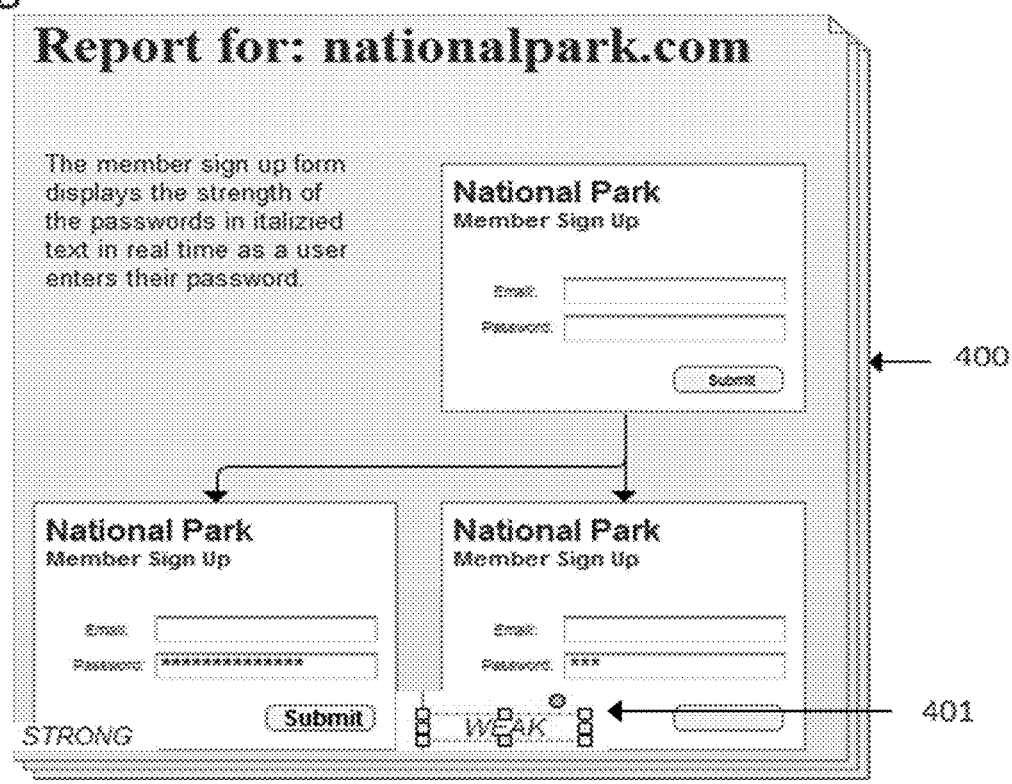
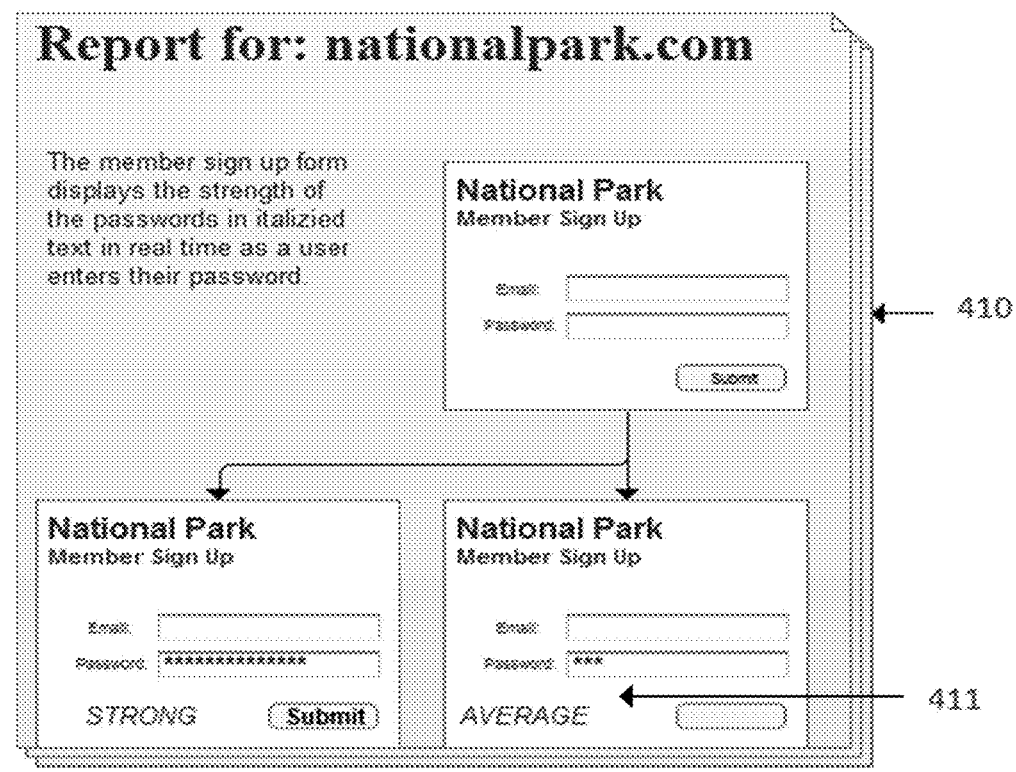

900

902 →

901

METHOD, SYSTEM AND COMPUTER PROGRAM PRODUCT FOR FACILITATING THE PROTOTYPING AND PREVIEWING OF DYNAMIC INTERACTIVE GRAPHICAL DESIGN WIDGET STATE TRANSITIONS IN AN INTERACTIVE DOCUMENTATION ENVIRONMENT

BACKGROUND OF THE INVENTION

Design programs for interactive graphical designs, such as web sites, often allow users to create designs by breaking the design into discrete design elements that can be individually specified. Just as in static illustrations, design elements in an interactive graphical design can have properties such as content, location, size, and color. However, in an interactive graphical design, these static properties can change when the design element is placed into different states as the user interacts with the design. For example, the outline of a button may darken when it is selected. The two states of such a button would be a "default" state and a "selected" state.

Documenting the characteristics of all the various design elements in an interactive graphical design can be difficult because of their varying characteristics. Documentation is most useful when it provides specific information about how a design element appears and what the design element does. However, as the state of a design element can vary widely, and in some cases is dependent upon the state of other design elements, the documentation needed for an entire design may either be too voluminous to provide any value, or be an incomplete picture of the design. In the field of web site design, the complexity of each individual page continues to increase as user interface designers strive to achieve numerous goals with a single page. At the same time, this increased complexity has necessitated ever more comprehensive documentation as nearly every web designer needs to explain the operation of their design to other stakeholders in the design process.

Exemplary documentation for an interactive graphical design can be described with reference to FIG. 1. In FIG. 1, a design element 100 is documented by documentation 110. As illustrated, design element 100 comprises a simple member sign up interface. Documentation 110 will generally be produced in a common word processing format or portable document format. Documentation for an interactive graphical design can be divided into sections where each section describes the appearance and operation of a design element. Documentation 110 shows a single section dedicated to design element 100 and includes an image 111 and a prose description 112.

Traditionally, web site designs have provided fairly basic interactivity such as clicking on a link and navigating to a new page. With these kinds of designs, documentation was so simple that a user could effectively document an entire web site using a basic image capture tool to capture a static image of particular design elements, and then paste the image into the documentation. The addition of a few lines of prose to the captured images, such as description 112, would provide the details required to describe the interactivity of the design element. However, even the basic design exhibited by web page portion 100 is difficult to fully describe via documentation. For example, the final entry in the interactivity section of description 112 says that the outline of the submit button darkens when the button is selected, but since it doesn't show exactly how the outline darkens, a reviewing stakeholder and the web page designer might not be on the same page in terms of how that interactivity is meant to appear in the finished design. Documenting even this simple design would therefore require at least two screen captures.

Complex interactive graphical designs are increasingly difficult to document. As mentioned, static image capture tools are inefficient for fully documenting the interactivity of complex designs. Although dynamic tools exist that automatically divide a design into elements and automatically generate basic descriptions for those design elements, they don't provide sufficient flexibility to a user and will often generate superfluous or incomplete documentation. A user needs to be provided with flexibility to define the scope of the documentation so that it is neither overcrowded with useless information, nor devoid of information regarding critical design details. Documentation is an important aspect of the design process for interactive graphical designs as it allows designers to communicate their ideas, share their progress, and get input on how the design is progressing. Therefore, methods and systems directed to improving the efficiency and efficacy of the documentation process are of significant and increasing importance.

SUMMARY OF INVENTION

In one embodiment, a computer-implemented method conducted using a processor and a memory comprises receiving a design element selection command from a user to select a design element in the interactive graphical design. The design element has been programmed to display a plurality of states in a rendering of the interactive graphical design in a player. The method also comprises receiving a documentation element addition command from a user to add a documentation element to the interactive graphical design. The method also comprises linking the documentation element and the design element, while the design element remains selected, such that the documentation element displays a representation of the design element. The method also comprises receiving a state selection command from the user to set a state of the design element that is displayed in a design window by the documentation element. The state selection command sets the state of the design element that is displayed by the representation of the design element to any of the states in the plurality of states and does not alter the design element.

In another embodiment, a graphical design environment stored on a non-transitory computer-readable medium comprises a documentation element in an interactive graphical design. The design environment also comprises a design element that displays a plurality of states in a rendering of the interactive graphical design in an external player. The documentation element: (i) is enabled to receive a selection from the user of a state in the plurality of states; and (ii) displays a representation of the design element in the state in response to receiving the selection from the user. The documentation element and design element are both instantiated by a processor operating in combination with the non-transitory computer-readable medium.

In another embodiment, a documentation tool for a graphical design environment stored on a non-transitory computer-readable medium comprises a documentation generator interface that allows a user to generate documentation for an interactive graphical design. The documentation comprises a documentation element. The documentation tool also comprises a link manager component that applies a modification made to a design element by the user in the graphical design environment to a representation of the design element in the documentation element. The design element is in the interactive graphical design. The documentation generator interface and link manager component are instantiated by a processor operating in combination with the non-transitory computer-readable medium.

BRIEF DESCRIPTION OF THE DRAWINGS

FIG. 4 illustrates documentation for an interactive graphical design being edited.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

Specific systems and methods disclosed herein seek to provide an efficient way to generate and maintain concise and informative documentation for an interactive graphical design. These systems and methods facilitate the documentation of interactive graphical designs in which design elements can have a multitude of widely varying states. Aspects of these systems and methods synchronize interactive graphical designs with their documentation throughout the development, deployment, and maintenance of the design. Aspects of these systems and methods additionally provide a user with the flexibility to define specific design elements for documentation and select specific states of those design elements for display in the documentation.

Figure 1:
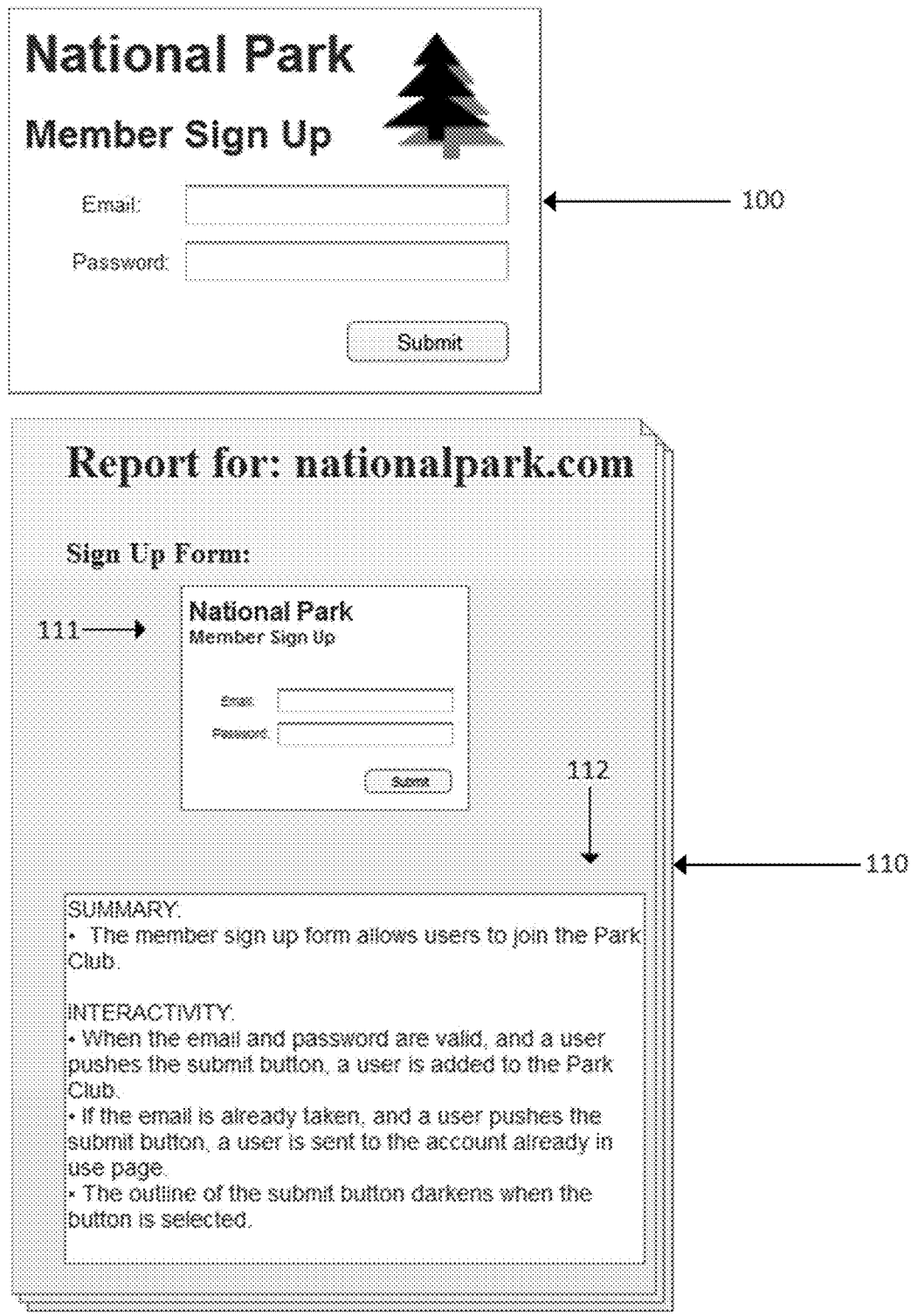
FIG. 1 illustrates the relationship between a portion of an interactive graphical design and its documentation in accordance with the related art.
Figure 2:
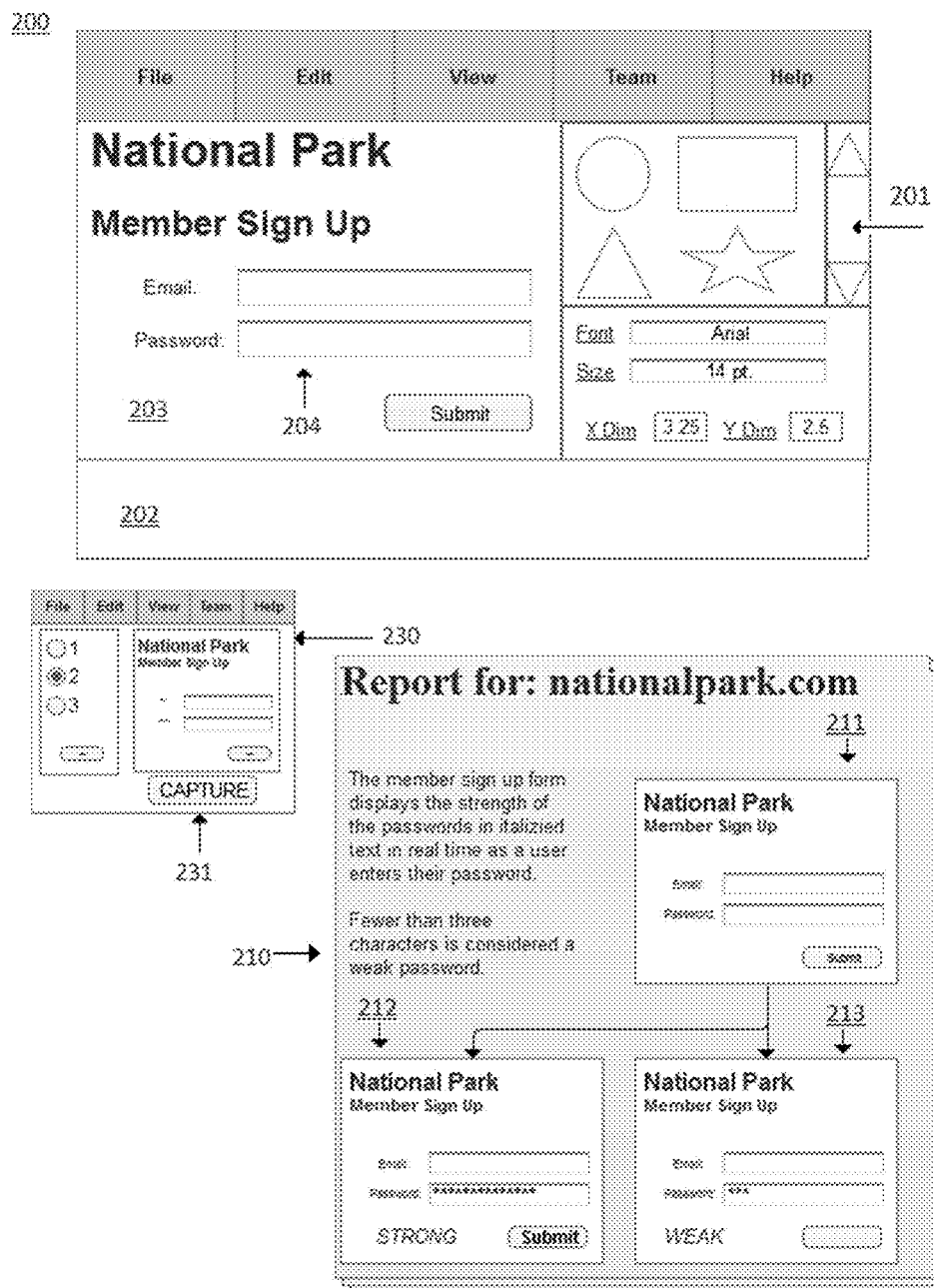
FIG. 2 illustrates a design in a design window of an interactive graphical design, a documentation generator interface, and documentation for a design.
Figure 3:
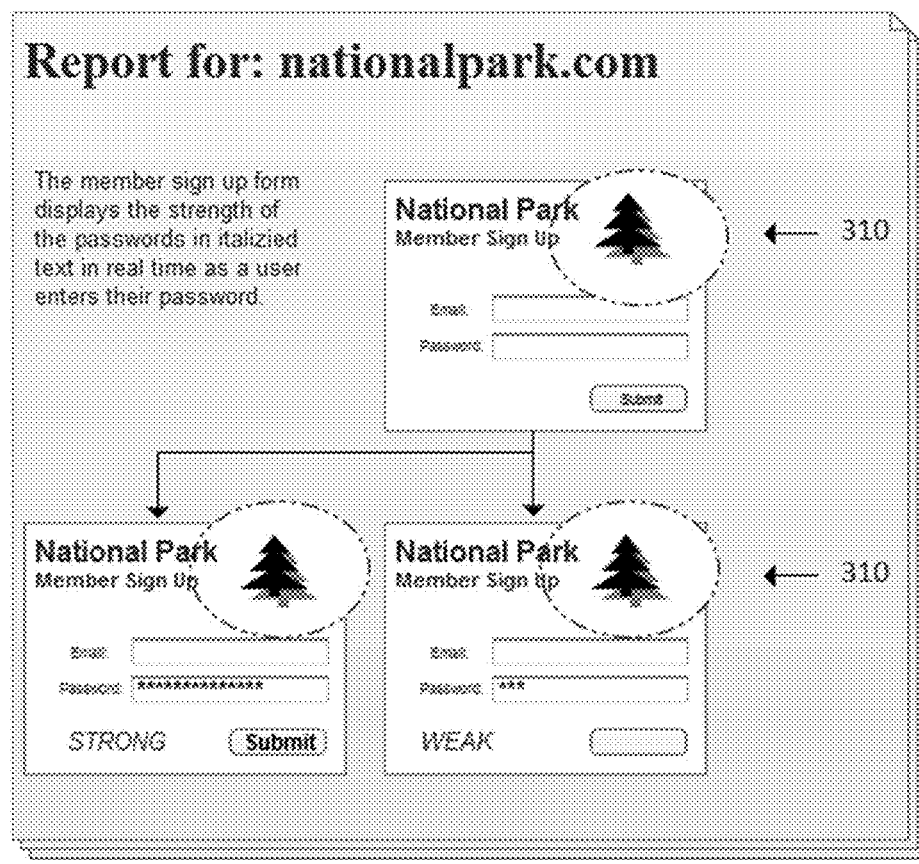
FIG. 3 illustrates a design in a design window of an interactive graphical design and documentation for the design.

A documentation tool for an interactive graphical design can be described with reference to FIGS. 2 and 3. FIG. 2 illustrates a graphical design environment 200 that includes a widget tool bar 201. Graphical design environment 200 allows a user to specify an interactive graphical design such as a web site. In FIG. 2, the graphical design environment has been used to specify a member sign up form 203 for a National Park web site. In this example, the button, text fields, and text labels were added via a drag-and-drop interaction with widget tool bar 201 and design window 202. The actual manner in which the design is specified is not essential to the methods and systems disclosed herein so long as the graphical design environment allows a user to select and combine different design elements to produce more complex design elements that interact to provide a desired end user experience when the design is rendered. In the illustrated example, each widget can be considered a design element, and the combination of discrete design elements that comprise form 203 can likewise be considered a design element. In this sense, design elements can be individual widgets, an entire page of a design, a dimension version of a design element, a master, a dynamic panel state, or any combination of the above.

Referring again to FIG. 2, documentation 210 comprises a page of documentation for member sign up form 203. Documentation 210 can be presented to a stakeholder in various forms. Documentation 210 could be presented to a user as a specific view available within graphical design environment 200. For example, a user that was designing or reviewing a design in graphical design environment 200 could be presented with an option to switch to a view where design window 200 was replaced with documentation 210. Documentation 210 could also be an exported document that is rendered outside of graphical design environment 200. For example, documentation 210 could be a text-based document rendered using a standard word processing program, an exported image, or a printed document. As another example, documentation 210 could be a portion of an interactive graphical design that is exported from the graphical design environment for rendering in an external player. If the interactive graphical design were a web site, the documentation could be a portion of the web site that is exported from graphical design environment for rendering in a web browser. Certain benefits could accrue to this approach in that anyone who was reviewing the design would also have immediate access to the documentation via the web browser.

The specific portion of documentation 210 that is illustrated in FIG. 2 includes three documentation elements: 211, 212, and 213. Although documentation 210 is illustrated as comprising three documentation elements, documentation 210 could instead comprise a single documentation element. The informational content of documentation 210 can take on various forms. As illustrated, the three documentation elements in FIG. 2 display images of form 203 and have been embellished with flow lines and text boxes with explanatory text to flesh out the informational content of the documentation. Documentation element 212 shows a representation of the design element with a strong password and documentation element 213 shows a representation of the design element with a weak password. A reviewer of the documentation would thereby be provided with an example of how form 203 responded to the input of a weak password and a strong password in a concise and informative format. Similar approaches could be used to show different navigation paths a user could take through an interactive graphical design by having the documentation elements display different design elements, such as different pages in a user experience flow, instead of different states of a single design element.

Documentation elements and embellishments could be added to documentation 210 in a drag-and-drop or click-and-edit fashion similarly to the way in which widgets were added to the design in graphical design environment 200. Such an approach would be particularly amenable to situations in which documentation 210 was specified within the graphical design environment because similar functionality would likely already be provided by the environment. However, this kind of functionality could also be provided by a stand-alone tool used to generate documentation 210.

Documentation elements 211, 212, and 213 each display a representation of form 203. However, in specific approaches, documentation elements will have different kinds of informational content regarding the design element. For example, the documentation element could include a list of properties of the design element and their values. As another example, the documentation element could display code that could be used to render the design element in a player or be used as part of another codebase. This approach would be particularly useful in situations where the graphical design environment exported or generated a renderable instantiation of the design using a first codebase while a particular stakeholder was interested in having the design rendered using a different codebase. The code could be HTML, CSS, and JavaScript used to render the design element in a browser.

As an interactive design is developed, the documentation for the design is necessarily in flux, because what it is describing is constantly changing. Keeping the documentation in sync with the design during development can be time consuming because nearly any change made to the design requires a change to the documentation. This task is made all the more difficult by the fact that documentation for an interactive graphical design will likely include multiple references to a single design element. As shown in FIG. 2, just illustrating a single kind of interactivity for a simple form requires three different images of a design element. Keeping the documentation and design in sync manually introduces the potential for them to diverge and render the documentation inaccurate. Furthermore, the process of developing and updating an interactive design can be a stressful and time consuming endeavor, so making it easy to update the documentation is the best way to make sure that it stays in sync with the design.

The three documentation elements in FIG. 2 are linked to form 203. Linking is administrated by a link manager component. The link manager component is a part of the documentation tool and can be built into the source code of the graphical design environment or can be part of a stand-alone documentation tool. Once a design element and a documentation element are linked, the link manager component will assure that modifications made to the design element are applied to the documentation element. As illustrated, multiple documentation elements can be linked to the same design element such that the link manager will need to assure that modifications made to the design element are applied to each of its linked documentation elements. In addition, a documentation elements may be linked to multiple independent design elements such that the link manager will need to assure that modifications made to any of the design elements are applied to that particular documentation element.

There are many ways by which the link manager can assure that modifications made to design elements are applied to their linked documentation elements. The link manager component could push modifications made to the design element to the documentation element. Alternatively, the link manager component could be part of the documentation element, and it could pull modifications made to the design element to the documentation element. The pulling operation could be conducted according to a periodic poll of the design element to see if any modifications had been made since the last poll. The pulling operation could also be conducted every time the documentation element was instantiated in memory. In other words, the link manager component could apply any modification made to the design element to the documentation element every time the documentation element was accessed in the graphical design environment or rendered in a design by an external player. In any of these situations, after design elements and documentation elements are linked, changes made to the design in design window 202, such as the addition of image 300, can result in corresponding modifications 310 to documentation elements in the documentation.

The link manager assists users in keeping the design and documentation elements in synchronization, and seeks to eliminate the potential for human error and increase the efficiency of the design process as a whole. Modifications made to the design element can be applied to the documentation elements by having the link manager update specific data relied upon by the documentation element to match altered data relied upon by the design element. Modifications can also be applied by having the link manager maintain pointers associated with the design element. The pointers may enable the documentation element and design element to utilize a common location in data. Notably, there may be multiple pointers associated with both the design element and the documentation element. In particular, if the linked design element is comprised of multiple discrete design elements, then the link manager may have to manage multiple pointers for the documentation element that are each particular to a discrete design element. In addition, if the documentation element is linked to multiple design elements, than each pointer can be associated with a particular design element. The common location in data can be a common location in memory if both the documentation element and design element are loaded in memory at the same time. However, the common location in data can also be a common location on disk.

In approaches in which pointers to common locations in data are used, the representation of the design element in the documentation element and the design element can both be presented using the informational content of that common data location. For example, if the representation of the design element in the documentation element were an image of the design element, the same data used to display the design element could be used to display the image of the design element using a pointer to a common location in data. As another example, if the informational content of the documentation element were a property of the design element displayed in text, the same data used to determine the text to display for the property value in the documentation element could also be used to generate the code necessary for the design element to exhibit that property value when rendered.

The design element is in the interactive graphical design, but the documentation element is not necessarily in the design. The documentation element can be part of a separate interactive graphical design or part of a separate documentation-specific file or system. The link manager component must therefore, in some cases, administrate a transfer of information out of the design and into the documentation, or out of a particular design and into another, using the link. In these approaches, the link manager may utilize data that includes a batch of modifications and that identifies the documentation and particular documentation elements to which the modifications should be applied.

The link manager can apply modifications made to the design element to the documentation element in various ways. The link manager can push modifications from the design element to the documentation element in real time as the modifications are made, push them in accordance with a periodic polling process, or push them in response to a specific command received from a user. The link manager can pull modifications to the documentation element from the design element in accordance with periodic polling process or in response to a specific command received from the user. In situations where the design element and documentation elements are in separate files or systems, the modifications can be saved, possibly in real time, and then applied to the separate document the next time it is opened. The specific command to push or pull the modifications can be received from the user via a pull down menu or button available in the graphical design environment. In addition, the specific command can be received from the user via a similar interface available in a stand-alone documentation tool.

Documentation 210 can be generated in various ways through the use of a documentation generator interface such as documentation generator interface 230. The documentation generator interface is a part of the documentation tool and can be built into the source code of the graphical design environment or can be part of a stand-alone documentation tool. The documentation generator interface can identify design elements automatically for which the user can generate documentation. For example, each widget or page added to a graphical design can be identified by the documentation tool as a potential design element for which the user will want to generate documentation. However, the documentation generator interface can alternatively or in combination allow a user to specify design elements for which documentation elements could be generated.

Design elements can be pre-specified by the design environment or documentation tool, or they can be specified by the user. For example, the graphical design environment might treat every widget or every page added to the design as a pre-specified design element for which a documentation element can be generated. As another example, the user may be required to specify design elements manually. These two approaches could also be used in combination such that design elements were pre-specified by the design environment, but users would be able to manually add design elements.

Design elements could be specified by the user in various ways. For example, documentation generator interface 230 could include a capture button 231 which would switch the design environment into a capture mode wherein a selection command subsequently received from the user would select a page, group of pages, a widget, group of widgets, or combinations thereof and specify them as a design element for which the user may want to generate documentation. As another example, a user could apply focus to a page, group of pages, a widget, group of widgets, or combinations thereof in the graphical design environment and then input a command to the graphical design environment to specify them as a design element for which the user could generate documentation. The command could be received from the user via a button available in a tool bar of the graphical design environment or via a pop up dialog that appeared in response to a right mouse click on the pages or widgets.

Documentation elements can be linked to particular design elements upon generation of the documentation element or at a later time. In other words, a new documentation element could be created specifically for a design element to which it is linked, or a new documentation element could be created generically and then linked to a design element at a later time. When a documentation element is generated and linked at the same time, the same command used to specify the design element could automatically create a corresponding documentation element for the design element. However, the automatic generation and linking could also apply when a design element is specified and a corresponding documentation element is generated at a later time. The specified design element could be presented to a user in a dialog with other design elements to allow the user to select design elements for which documentation should be generated. Manually specified design elements could appear alongside other design elements that were specified automatically by the graphical design environment. For example, an option to generate a documentation element for form 203 as manually specified by the user could appear alongside an option to generate a documentation element for the password text field 204 as automatically specified by the documentation tool when the text field 204 was added to the design.

A documentation tool that is in accordance with the teachings herein can comprise any combination of the approaches above. As a basic example requiring minimal effort from a user, documentation elements could be generated and linked to pre-specified design elements via a single command from the user. The user could issue a single generate documentation element command for a particular page in their design, and a linked documentation element displaying a representation of the page would be generated and appear in the documentation all in one step. The generate documentation element command could involve selecting a page from a sitemap panel in the design environment and dragging it into the design. As a more complex example, form 203 could be specified by a user after selecting capture button 231, documentation element 211 could be added to documentation 210 without documentation element 211 being linked to a specific design element, and then a link command could be required to link documentation element 211 with design element 231. After the link was created, the user could also be required to specify the informational content of the documentation element by specifying that the documentation element should display a representation of the design element or code to be used to render the design element.

In specific approaches, a representation of a design element displayed by a documentation element can be edited in place in a similar fashion to how design elements are edited. In other words, the representation of the design element can be available to receive a first modification that is directly entered by the user via the documentation element. FIG. 4 illustrates two versions of documentation: 400 and 410. As shown in documentation 400, a portion of one documentation element 401 has been selected for editing via a selection reticle. The text of the portion of the documentation element has been edited as shown in 411 of documentation element 410 by changing the text from "Weak" to "Average." In this situation, the documentation element has retained knowledge of the original discrete widgets that form the design element to which the documentation element is linked such that they can be edited as if they were still discrete widgets. In particular approaches, these modifications could be pushed back through the link to the design element either automatically or in response to a command received from the user as described above with reference to modifications made to the design elements.

The graphical design environment and documentation tool can manage edits made via the documentation element or the design element in the graphical design in various ways. In specific approaches, when modifications to the design element are made in the graphical design environment, and are pushed to the documentation element, any local modifications made via the documentation element since the link to the documentation element was created can be wiped out. With reference to FIG. 4, this would cause the modification of the text from "Weak" to "Average" to be reversed even if the subsequent modification to the design element only changed the font style and not the textual content of the widget. In other approaches, local modifications made to the representation of the design element via the documentation element can remain in place only to the extent that they do not conflict with subsequent modifications that are pushed from the design element. In these approaches, the later modifications made to the design element in the graphical design environment will, when pushed, only alter the representation of the design element in the documentation element to the extent that they do not conflict with modifications made directly to the documentation element at an earlier time. With reference to FIG. 4, a modification made to the design element that set the text to a bolded font would not alter the textual content from the word "Average" even if the design element still used the word "Weak," but the word "Average" would appear in bolded text. In other words, the font would change to reflect the subsequently received modification, but the textual content would not. In other approaches, local modifications made to the representation of the design element via the documentation element can override later modifications that are made via the design element.

Modifications made to different kinds of properties can be managed by the link manager in different ways. For example, changes to design element properties that affect the default state of a design element may always wipe out modifications made to the representation of the design element via the documentation element while changes to design element properties that only present in other states may not. The way in which the link manager handles conflicting edits made to the design element and documentation element may be configurable by the user.

The informational content affected by the link between the documentation element and design element can take on various forms. The informational content affected by the link can just encompass the appearance of the design element, just values for properties of the design element, or it can include all aspects of the design element. As mentioned previously, the link can be maintained via pointers to a common location in data. The link can also be maintained by updating a copy of a collection of data such that the accuracy of the copy is maintained as the original data is modified. The copy would be stored at a separate location in data. In situations where the informational content affected by the link only comprised the appearance of the design element, the common data could be a set of properties defining the appearance of the design element such as its shape and color. The documentation element could also be rendered using a hybrid of the pointer to common data approach and a separate data approach. In particular, in situations where a representation of the design element could be locally modified in the documentation element, the data used to render the edited properties could be accessed via the pointer approach before being edited and the separate data approach could be employed after the property was edited.

The documentation element and design element can be rendered in different ways using the same data. In particular, a stand-alone documentation tool may need to manipulate the data from its native format somewhat before it is capable of rendering an image from the data. In situations where all aspects of the design element were available to both the documentation element and the design element, the states of the representation of the design element in the documentation element may be rendered in a different way. For example, the documentation element may be rendered via access to separate collections of data that define different states of the design element. The separate collections of data can be derived by the documentation tool from the data that defines the design element including any associated events and event handlers.

As shown in FIG. 2, documentation elements can display representations of their linked design elements in various states. Design elements in an interactive design can display different states when they are rendered according to how they have been programmed in the design environment by user. As described previously, documentation element 212 shows form 203 in a "strong password" state and documentation element 213 shows form 203 in a "weak password" state. The properties of the widgets in a design element will differ across different states. Examples of properties that might change in the different states of a design element include the textual content of a text label widget, the image displayed by an image widget, the location and size of a widget, the color of a widget, the status of the widget as visible or hidden, the arrangement of widgets in a dimension version, or the current view displayed by a dynamic panel widget. To facilitate efficient documentation, the state displayed by an image of a design element can be selected directly via the documentation element. As such, documentation element 211 could have been added to documentation 210 three times, and simple direct modifications could have been conducted on two of them to change the state reflected by the image to the state in 212 and 213.

Figure 5:
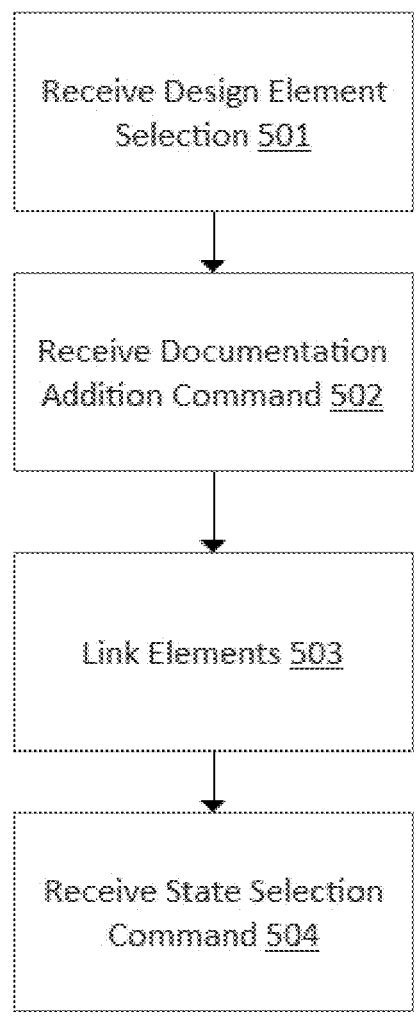
FIG. 5 illustrates a method for linking a documentation element with a design element.

FIG. 5 illustrates a computer-implemented method 500, wherein each step can be conducted using a processor such as processing system 1101 and a memory such as memory 1102. A design element selection command is received from the user in step 501. Prior to step 501, the design element will have been specified automatically by the design environment or manually by a user. For example, every page added to a design could be automatically specified by the design environment as a design element. As another example, a user may select multiple pages or widgets in a design and specify them manually as a design element. The processor will receive the design element selection command from the user and select a specified design element in the interactive graphical design. The selection command could be delivered via a mouse click on a single design element in the design, a series of mouse clicks on different design elements received while a key was held in place, a click-and-drag selection covering one or more design elements, or a selection of one or more design elements from a dialog. The selection command identifies the selected design element to the graphical design environment as the design element to which a documentation element will be subsequently linked. The graphical design environment will therefore maintain the identity of the design element as the selected design element after the selection command has been received until the link has been created by the documentation tool. The design element can therefore remain selected regardless of whether the design element is continuously displayed in the design environment. Indeed, in approaches in which the documentation tool is separate from the design environment, the design element can remain selected even if the design environment is suspended or closed.

The design element selection command can be received via any interface that displays design elements or information regarding a design element. For example, a design element selection command could be received via a design map interface. A design map interface displays a summary view of an entire design in a hierarchical list format where line items in the list include pages of the design, masters of the design, or any other design element in the design. As another example, a design element selection command could be received via a masters toolbar. A masters toolbar allows a user to select masters for addition to a design. The design element selection command could be received via a mouse down command on the corresponding line item in any of these interfaces. Since the design map and masters toolbar may be used for other purposes, the mouse down command could require the simultaneous selection of a hot key in order for the mouse down to serve as a design element selection for purposes of step 501.

In step 502, a documentation element addition command is received from a user to add a documentation element. The documentation element addition command can be received by the graphical design environment. In that case, the documentation element would be added to the interactive graphical design. Documentation tools that are associated with similar steps were described above and involve situations where the documentation is a part of the interactive graphical design. For example, the documentation could be a page or set of pages that are included in a web site design. The web site design itself could have links to the documentation so that a user reviewing the web site could efficiently switch back and forth between the documentation and the design. In these situations, the documentation element addition command could be similar to the kind of command from a user that would add a widget or new page to the design. For example, the documentation element addition command could be the selection of a documentation element via a drag-and-drop action using a toolbar and a design window. As another example, the documentation element addition command could be the drop portion of a drag-and-drop action where a design element was selected using a toolbar and a design window. The toolbar could be the masters toolbar or the design map interface described above. The documentation element addition command could also be received via a dialog interface. For example, a list of design elements could be presented to a user and the user could select a design element for which a documentation element should be created.

In step 503, the documentation element and the design element are linked. The linking could be conducted when the documentation element is added. For example, the linking could take place during the drop portion of a drag-and-drop action in which the related design element was selected. In this example, steps 501-503 would be executed by the mouse down, drag, and drop portions of a drag-and-drop command involving a drag from an interface in which the design element was selected and a drop in the design window. In situations where the interface was used for other purposes, the drag-and-drop for generating a related documentation element could require simultaneously pressing a hot key. In situations in which the documentation element is generated for a particular design element, the linking and generating will generally occur as part of the same process.

The linking could also be conducted after the documentation element is generated. In these situations, a link command could be delivered to the documentation tool while the design element was selected. The design element could be selected directly in the design environment or the design element could be selected indirectly via a textual description of the design element in a dialog. For example, a "link" button could be displayed in the design environment to receive the link command or a "link" item could appear in a dialog when the selected design element received a right click input from a mouse. The linking could also be conducted via the simultaneous selection of both a design element and a documentation element coupled with delivery of a similar input to the graphical design environment from the user.

Certain benefits accrue to situations in which the linked design element and documentation element appear in the same interactive design, or are at least both in designs that are editable by the graphical design environment. When the link is set up such that modifications made to the design element are automatically applied to the documentation element, having the two elements in the same format and accessible to the same underlying process can make keeping the elements in sync less computationally intensive. In addition, it may be easier to implement an approach in which the two elements are in the same design because it would not be necessary to design a component that could store modifications temporarily to be applied to a separate documentation file or system if the separate file or system were not available while the edits were being made.

After a design element and a documentation element are linked, further iterations of steps 501-503 can be conducted to edit which design elements a particular documentation element is linked to. For example, if a documentation element were initially linked to a page, the link could be edited so that the documentation element was instead linked to a particular design element within that page. A subsequent design element selection command could be received from the user and that particular design element could be linked to the documentation element. The execution of this iteration of the design element selection could be guided by the initial iteration. For example, a list of design elements included on the page to which the documentation element was already linked could be displayed to a user. As another example, a graphical representation of the page could be displayed to the user to allow the user to execute another iteration of the design element selection process. The design element selection command could involve a drag-and-select or click-to-select command conducted on the graphical representation.

Certain benefits would accrue to approaches in which the execution of subsequent design element selections for a particular documentation element was guided by the initial iteration of steps 501-503. The initial iteration could be kept simple by only allowing links between pages and documentation elements. The first simple step of linking a documentation element and page would then be followed up with a slightly more complex process of selecting particular design elements from within that page. Although the combined process would require two steps, it could potentially be more user friendly than a situation in which the design element was selected in a single step because the selection made in the second step would involve a much smaller set of potential design elements.

Although step 501 is drawn subsequent to step 502 in method 500, other methods involving the documentation tools described herein would reverse the order of these steps such that the documentation element was added to the design first and the design element was subsequently selected. For example, the documentation element could be added to the documentation, and selection of the documentation element could bring up a dialog of design elements or listing of design elements that the documentation element could be linked to. The design element selection command would then be received via the dialog. The dialog could appear in the properties pane when the documentation element was selected. The dialog could be a list of pages or other design elements similar to the design map interface described above. A summary of design elements that the documentation element was linked to could also show up in the properties pane. The summary could be a graphical representation of the design elements or a list of design element names. An interface element in the properties pane could also be selected to trigger the appearance of the dialog to keep the properties pane from being too crowded. This approach could also be used in combination with other ways to link the documentation element and design elements. For example, the documentation element could be created for a particular design element using a different approach, and the dialog could be used to edit the design elements that the documentation element was linked to.

In step 504, a state selection command is received from a user that switches the state displayed by the representation of the design element in the documentation element. As mentioned above, design elements can exhibit a plurality of states in a rendering of the interactive graphical design. As shown in FIGS. 2-4, form 203 can exhibit a strong password state, a weak password state, and a default state. When the informational content of the documentation element changes in response to the state selection command, the design element is not affected. The state selection command can be received from the user through the selection of a radio button or check box in a dialog that displays the plurality of states or a subset of the plurality of states. In specific approaches, the state selection command will potentially modify the state displayed by a representation of the design element to any of the states that the design element can exhibit. In other approaches, the state selection command will apply the selected state to the documentation element in other ways depending upon the type of informational content specified for the documentation element. For example, the properties or source code displayed by the documentation element can switch to reflect aspects of the selected state of the design element. The displayed states can be displayed to the user as a list of short textual descriptions of the states. The textual descriptions can be provided by the user or assigned automatically by the graphical design environment. The displayed states can also be displayed to the user with a preview of how the representation of the design element would appear in the relevant state.

Figure 6:
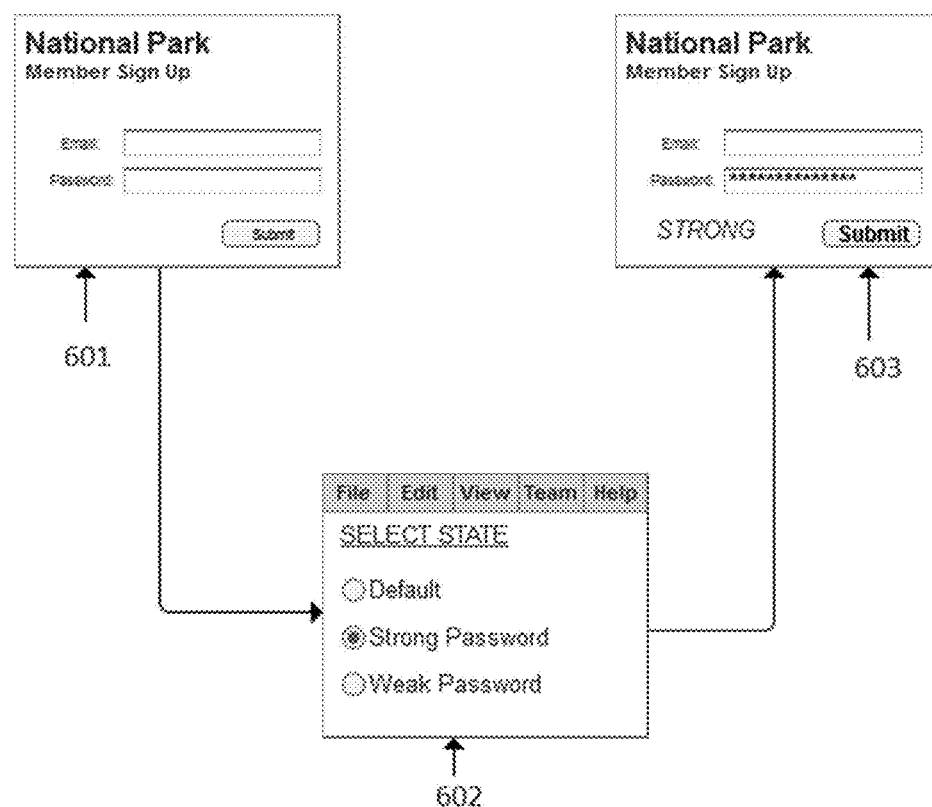
FIG. 6 illustrates an interface for selecting a state for a representation of a design element in a documentation element, and the effect of the interface on the representation of the design element.

An exemplary execution of step 504 can be described with reference to FIG. 6. A graphical design environment 600 can be stored on a non-transitory computer-readable medium and include a documentation element and design element instantiated by a processor operating in combination with the non-transitory computer-readable medium. The documentation element can be linked to a design element that displays a plurality of states in a rendering of the interactive graphical design. The documentation element can display the design element in a default state 601 when it is initially linked to the design element. The documentation element can be enabled to receive a selection from the user of a state in the plurality of states and display a representation of the design element in that state. The documentation element can receive the selection of a state from the user via a state display interface. The state display interface can appear when focus is placed on the documentation element or when the documentation element is selected with a double click or other command. As shown in FIG. 6, state display interface 602 is a dialog with radio buttons that allow the user to select a state to be displayed by the representation of the display element. In the illustrated example, the state selection command is a selection of the "Strong Password" state in state display interface 602, which causes the documentation element to switch the representation of the design element from the default state to the strong password state 603.

Figure 7:
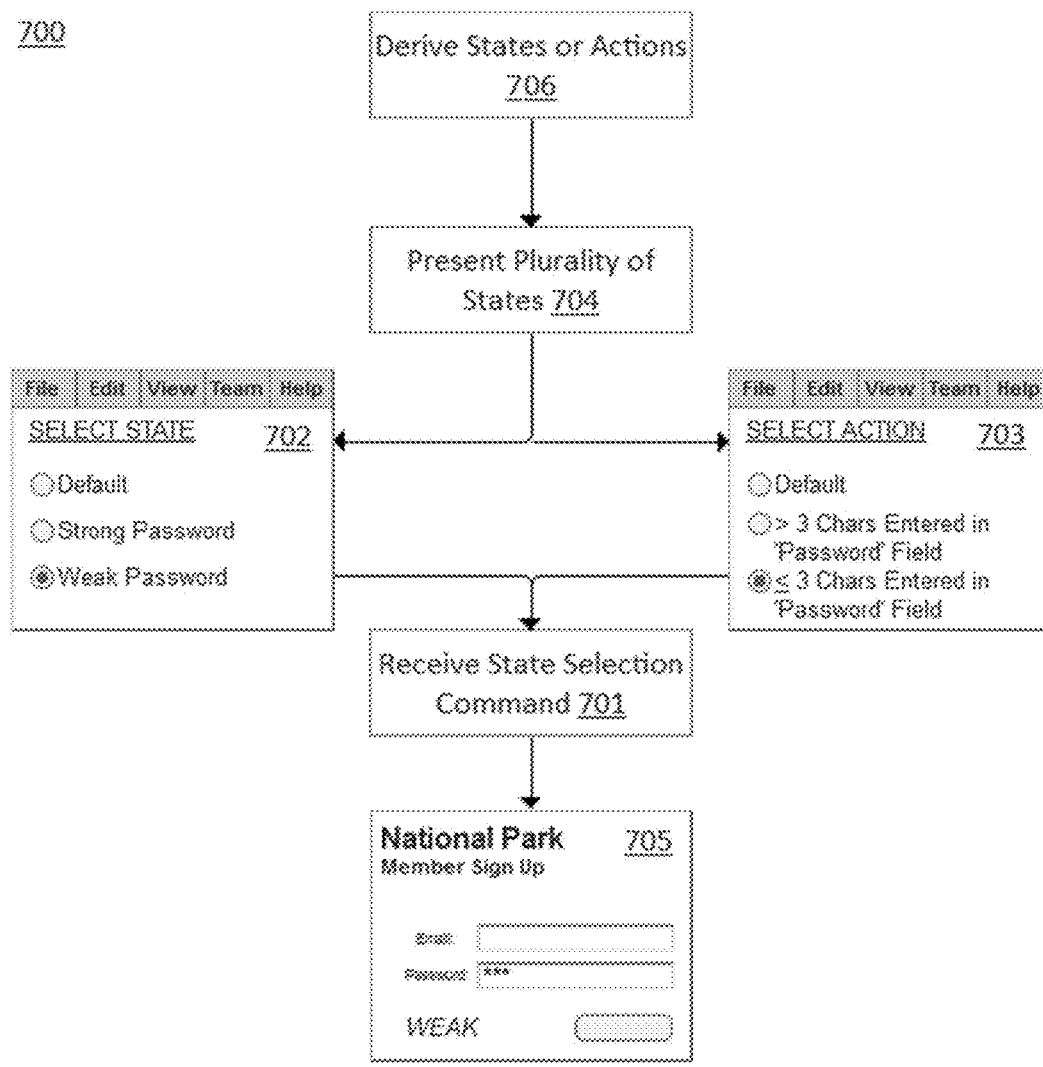
FIG. 7 illustrates methods for selecting a state for a representation of a design element, and the effect of those methods on the representation of the design element.

FIG. 7 displays a set of interfaces combined with a flow diagram 700 that illustrates specific ways in which a state can be selected and applied to a documentation element. In step 701, a state selection command is received from a user via a documentation element state display interface such as interface 702 or interface 703. Documentation elements can display a representation of a design element in a default state until a state is selected.

Step 701 can be preceded by step 704 in which the plurality of states are presented to the user such as in interface 702 where each state for the design element is provided in a list for selection. The states can be presented directly to the user in an interface 702 and allow the user to select specific states such as the "Weak Password" state. The plurality of states could also be presented to the user such as in interface 703 where a set of actions are presented to the user that will place the design in each of the plurality of states when executed. An action can initially be blank, and can be specified by the user through the selection of a set of events and event handlers that can be combined and configured to place the design in a plurality of states. The user can therefore select an action by configuring the action from component parts that are displayed by the documentation tool. Regardless of which form the state selection command takes—either selection of a state or an action that places the design in a given state when executed—the documentation element 705 will subsequently display a representation of the design element in the same state.

Each action in the set of actions can be a collection of events and event handlers that the design element can respond to. Event handlers that could place the documentation element into a given state include: set text on widget, set panel state, or a set page to responsive dimension version. The events and event handlers can be those that are already natively defined for a design element. For example, the native event could be an "on click" event for a drop down menu and the native event handler could result in the content of the drop down menu being displayed on the page. The events and event handlers can also be those that have been specified by the user for a design element. For example, the event hander could be the "set the text on a text field widget" event handler that was specified on a widget in the design element. In addition, the events and event handlers could include documentation-specific event handlers that have no relationship to existing event handlers in the design element.

For example, the event handler could be a "set the text on a text field widget" event handler that is not specified in the design element.

Actions could be defined as a combination of documentation-specific, user-specified, and native event handlers and events. The events and event handlers that comprise each action could be updated by the link manager whenever the design element was modified to preserve consistency. For example, if the name of a widget changed in the design from "Button_1" to "Submit_Button", a component event for an action could change from "OnClick Button_1" to "OnClick Submit_Button." In the case where user-specified events or event handlers in the design element are part of the action, changes to the user-specified events or event handlers in the design element could also be synchronized by the link manager. Once an action was specified, a user could later reorder or delete the component events and event handlers, or add additional events and event handlers to the action.

Different approaches to receiving state selections from a user are better suited for the situation where documentation elements are generated long after the selection is received and when the documentation elements display the appropriate representation of the design element as soon as the state selection command is received. For example, situations in which the documentation element displays the appropriate state upon being exported from the graphical design environment are more conducive to approaches where the state selection command is the selection of an action. If the documentation element is only generated or switched into a particular state when the documentation is exported from the design, the documentation element could be generated using a large portion of the same code used to generate the design element itself, and would only need to be modified to the extent a script is needed to conduct any documentation-specific event handlers. For example, the code used for form 203 could be generated twice (once for the design element and once for the documentation element) and a script could be added to the documentation to place three text characters into the password field of the documentation element.

Prior to the display of the states or actions, a separate step 706 could be conducted in which the plurality of states or actions are derived from the content, events, and event handlers associated with the design element. This derivation step can be conducted when the design element is specified, when it is linked to a particular documentation element, any time a linked design element is modified, any time the documentation element is loaded into memory, or in response to a request to display the states. For example, the documentation tool could determine that the text label that displays the strength of the password is modified when an event occurs on the password text field. In this example, two different event handlers may be executed depending on the number of characters in the password field. Therefore, two states of the design element would be derived for when that event has occurred and the appropriate event handler has been executed to display the strength of the password in the text label, and a third state of the design element would be derived for when that event has not occurred.

The derivation step could be conducted based on a collection of rules to limit the number of states and actions to a manageable amount for a user to consider. For example, all event handlers for a widget that were not specified by a user could be screened from the derivation process. As another example, all event handlers that did not manifest in a change in appearance of the design could be screened from the derivation process.

The derivation step could also be conducted with guidance from the user from within the graphical design environment. As mentioned above, the graphical design environment could derive every possible combination from the entire set of native and user-specified events and event handlers for a linked design element. However, a user could also specify a particular set of events and event handlers that will be exposed to the documentation element. This set could be chosen by the user on an event-by-event and handler-by-handler basis. The set of selected event and event handlers would then be used to derive the plurality of states. This approach would be computationally less taxing, and would prevent the user from being bombarded with the option to select combinations that are not very interesting from the perspective of generating a useful documentation for a design.

After the states are derived, the graphical design environment could display the derived states to the user in the form of images of the design element in each of those states, and allow the user to specify names for each of the states. However, the graphical design environment could also intuit the appropriate names for states based on the content, events, and event handlers associated with the design element. For example, in the case of form 203, the design environment may utilize the content of the text block that changes in each state to name the specific states (e.g., "Strong" state, "Weak" state, and "Default" state). The labels for the actions in interface 703 could also be derived from the content, events, and event handlers associated with the design or manually specified as with the states.

The event handlers and events can be captured when the relevant design element is specified. For example, when a capture button is selected and a design element is selected, the graphical design environment could interrogate the design to determine what events the design element was listening for and what event handlers the design element was programmed with to respond to those events. The states and actions to place the design element into those states could then be derived from that information. In these approaches, the link manager could continue to monitor the events and event handlers associated with the design element and continue to keep the documentation element in synchronization with the design element by updating the states and actions that are presented to the user in the state selection interface. This synchronization could be conducted every time the documentation element was loaded into memory, selected, edited, or in response to a request to display the derived states or actions.

States and actions for the design element can be set manually by a user instead of being programmed into the design. In other words, the states might not be states that the design elements were programmed to express when the design is rendered. Instead, the user could modify the properties of the design element in the design environment and save different versions of the design element as different states of the design element strictly for purposes of documentation. The modification of these properties could be any property modification applicable to the design element. However, the modification could also be a specialized set of property modifications that were not otherwise available in the design environment, but that would alter the design element to reflect its appearance in a finished design. For example, a radio button widget in a graphical design environment might always be displayed in an unselected state in the design environment, but the property editor used to place the widget in a particular state for documentation might include the ability to place the radio button in a selected state. The user could specify actions in a similar way—by manually specifying actions in the design environment using an interface that would allow a user to specify any action that the design element was capable of responding to.

The documentation element state display interface can be called up and displayed for the user in various ways. For example, the documentation element state display interface can be displayed when the documentation element is selected or when the documentation element is selected while a hot key is pressed or a specialized selection action is conducted such as a right click on the documentation element. The documentation element state display interface could also be displayed to the user as part of the documentation generator interface and provide the user with a way in which to specify how the particular documentation elements are meant to be generated. In addition, a combination of these approaches may be applied in which the documentation element state display interface could be displayed to the user when the documentation elements are generated and be displayed in a similar form if a user wanted to change the state displayed by a documentation element at a later time.

The state reflected by the documentation element can be switched or applied in various ways. For example, if the representation of the design element were an image, the displayed image of a design element could immediately switch from one state to another. In the alternative, the documentation element could be prepped to switch states upon being exported from the graphical design environment or being rendered in a player.

Applying a state or action to a documentation element on export of the design, or upon generation of the documentation, could be conducted in various ways. During export, when the design was rendered in a player, or when the documentation was viewed in a stand-alone documentation tool, the documentation element could be generated as a flat image of the representation of the design element in a particular state or as the design element would appear in response to an action. As another example, the OnPageLoad event in an exported design or report in the form of an HTML and JavaScript code could be used to set the state of the documentation element by modifying its properties from a default state directly or by applying an action to the documentation element as if it were a design element to display the appropriate state. For example, a code snippet could be generated to apply an action to the documentation element upon being exported from the design. The latter approach would allow the code needed to instantiate the documentation element to mirror, in large part, the code needed to instantiate the design element itself. Additionally, the code used to instantiate a documentation element and apply the required action to that element could include additional code that would lock the state of the documentation element such that it did not respond to additional events once the action was applied. As another alternative, the documentation element could be generated in a way that it displayed the desired state when it was time to generate the documentation.

Figure 8:
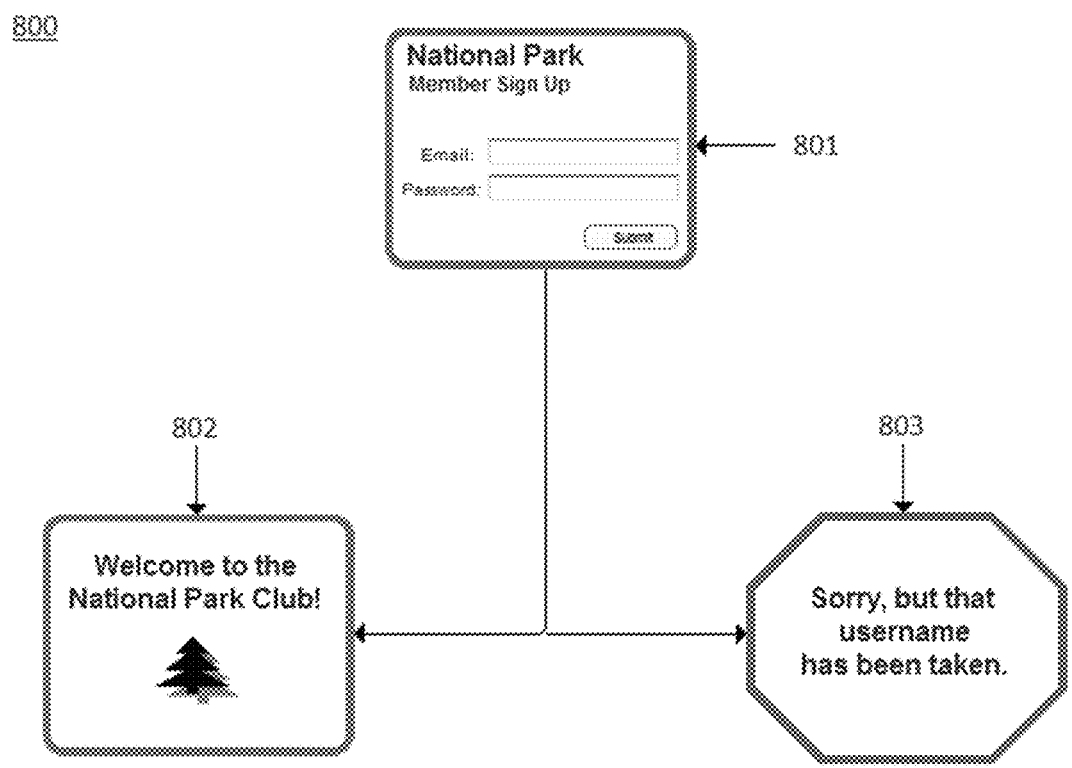
FIG. 8 illustrates a set of documentation elements for an interactive graphical design that have been edited to include graphical embellishments to improve the utility of the associated documentation.

FIG. 8 displays documentation 800 having multiple documentation elements 801, 802 and 803. These documentation elements illustrate the potential flow of a design experience with the design that documentation 800 is documenting. As shown, documentation element 801 is linked to form 203 and shows the form in a default state. The other documentation elements in documentation 800 show different pages in the design that a user can be directed to from the member sign in page depending upon the information provided. Documentation element 802 is linked to a member sign up success page while documentation element 803 is linked to a member sign up failure page.

The documentation elements in documentation 800 can be added to the documentation in a similar fashion to the way design elements are added to the design. They can also be moved, resized, and arranged within the documentation in a similar fashion to the way design elements are arranged in a design. If the documentation element has been linked to a design element and is configured to display a representation of the design element, the representation of the design element can be scaled with the documentation element when it is resized, or it can stay the same size while the documentation element is scaled. In addition, documentation elements can be modified with graphical embellishments to provide a more user friendly documentation for the design, to set off documentation elements from the design in situations in which the documentation elements were part of the design, or to differentiate different kinds of documentation elements such as documentation elements displaying properties of design elements and documentation elements displaying images of design elements. The borders of the documentation elements could be customizable, connection points for flow diagramming could be built in or added to the documentation elements, and the opacity and fill patterns of the documentation elements could be customizable. Additional graphical elements could be added to the documentation such as flow lines, text blocks, or other design elements to enhance the informational content and utility of the documentation.

Documentation element 803 has an octagonal raised border to evoke the concept of a stop sign to show that the design flow illustrated is a termination point of the design experience. The graphical embellishment succinctly informs the user that either the design is a prototype and further interactivity along that particular design experience is not available, or that that path of interactivity is not a desired path to take while utilizing a finished version of the design. Different kinds of embellishments could be utilized including arrow shaped borders to assist a user in tracing a flow through the interactivity or different colored borders to illustrate different paths through the design.

The representations of design elements that are presented in the documentation elements can be manipulated to show different portions of the representation and to apply different levels of zoom to the representation. The graphical design environment can include an image adjustment interface that can be instantiated using a processor operating in combination with the non-transitory computer-readable medium on which the graphical design environment is stored. The image adjustment interface can accept image adjustment commands from a user. The image adjustment commands can pan, zoom, rotate, and crop the representation of the design element.

The image adjustment interface could be instantiated for a particular documentation element upon placing the documentation element into an image adjustment mode. The image adjustment mode can be activated when the documentation element is selected by a double click command received from a user. The image adjustment interface could also appear for individual documentation elements, for each documentation element currently loaded in memory, or for each documentation element in the documentation in response to a hot key command or interface button selection received from a user. In situations in which the representation of the design element in the documentation element was a static image, the image adjustment mode could also be triggered as soon as a cursor was placed within the border of the documentation element or whenever design environment focus was placed on the documentation element.

Figure 9:
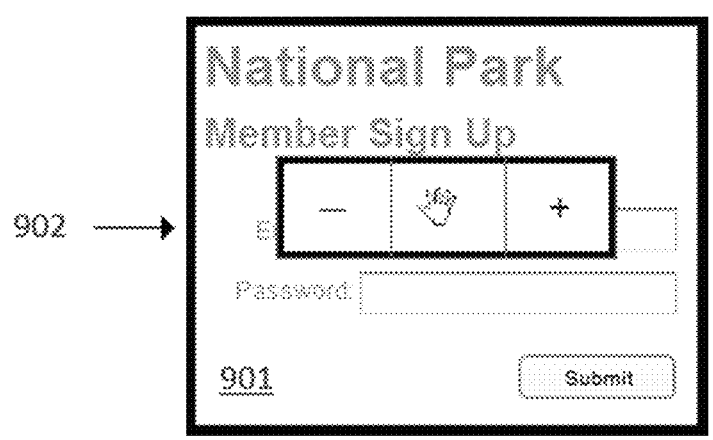
FIG. 9 illustrates an image adjustment interface for adjusting a representation of a design element in a documentation element.

FIG. 9 illustrates an exemplary image adjustment interface 902 in documentation 900 with documentation element 901. The exemplary image adjustment interface 902 can appear overlain on the documentation element 901 as soon as the documentation element is placed into an image adjustment mode. The image adjustment interface includes a hand icon which can be selected and moved in any direction to pan the image of the representation of the design element within the documentation element. Long distance panning can be triggered by moving the cursor outside of the documentation element's borders while holding a mouse button down. In situations where a documentation element comprises an entire design window or documentation display window, long distance panning can be triggered by moving the cursor into close proximity with the element's borders. Exemplary image adjustment interface 902 also includes a plus and minus sign for zooming the image of the design element in and out. The image adjustment interface can disappear when a user clicks outside the border of the design element, or when the user clicks a specialized button or hot key. The button can be a part of the graphical design environment.

The image adjustment interface could also comprise a single cursor within the border of the documentation element. Alternatively or in combination, the image adjustment interface could be a set of user interface elements that would appear on the border of the documentation element. The interface elements could include buttons with directional arrows for panning, plus and minus signs for zooming, and a rotation handle for rotating the image. The single cursor could be a hand cursor, and a mouse down and drag command received from the user could pan the image while a mouse scroll wheel input could zoom in and out. The image adjustment interface could provide more than one way to input the same type of image adjustment command. For example, the image adjustment interface could accept either scroll wheel inputs from a mouse, or clicks on zoom in and out buttons presented on the border of the documentation element to adjust the zoom level applied to the representation.

Figure 10:
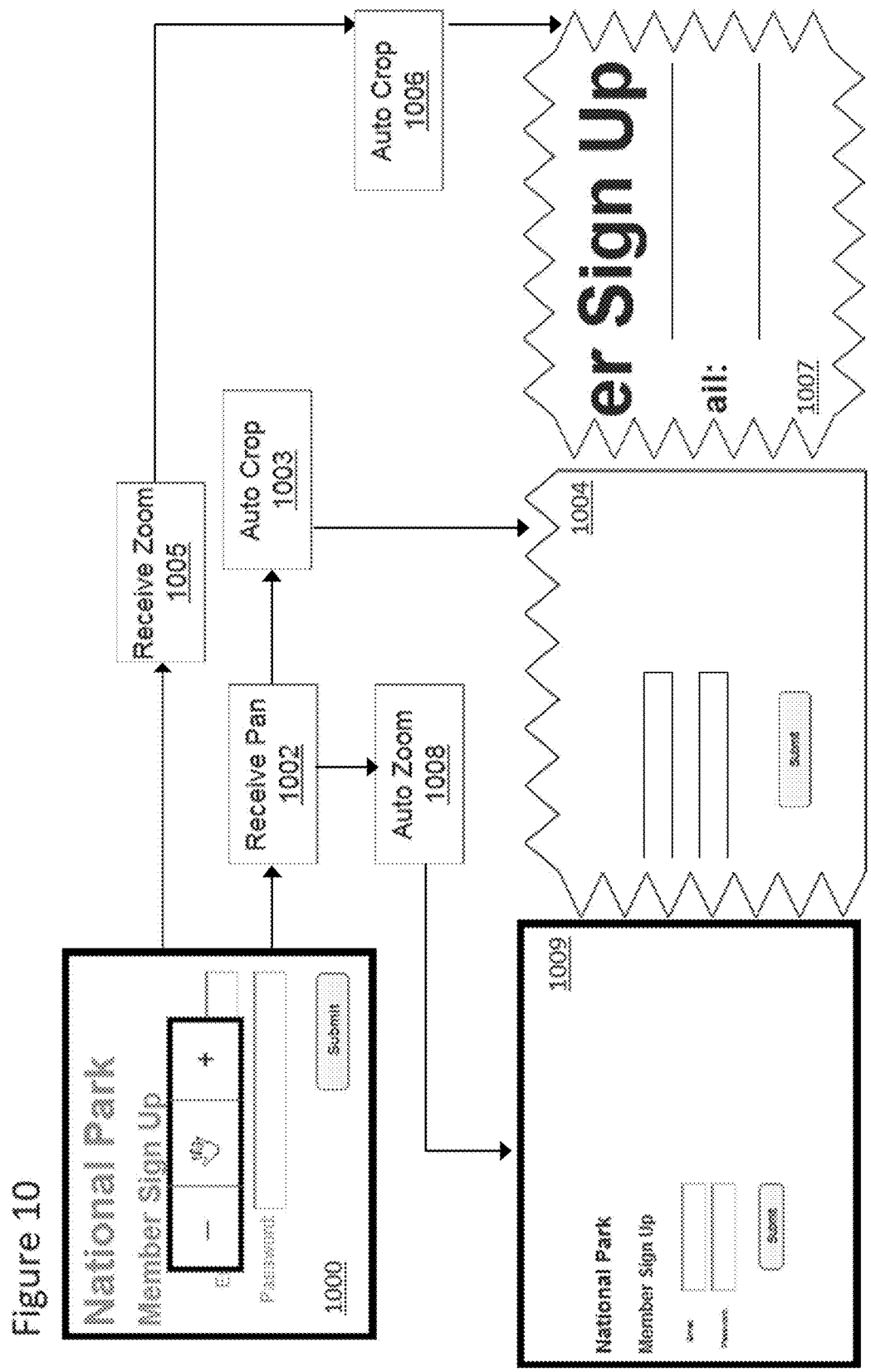
FIG. 10 illustrates a set of methods for altering a representation of a design element in a documentation element, and the effect of those methods on the representation of the design element.

When the representation of the design element is panned or zoomed portions of the representation may move out of or into the area defined by the border of the documentation element. FIG. 10 illustrates several ways in which the documentation element could respond to the pan and zoom command to deal with this issue. The first approach would be to keep the representation of the design element at the same zoom level and to automatically crop the image. In step 1002 an image adjustment command is received from the user via image adjustment interface 1001 to adjust a relative location of the image of the design element within the area defined by the documentation element 1000. The step can be conducted using a processor and a memory. In step 1003 the image is automatically cropped if the image adjustment command moved a portion of the image of the design element outside of the area defined by the documentation element. The effect of such an operation is illustrated by documentation element 1004 in which the image of the design element has been panned to the right and down and has been automatically cropped. If the image adjustment command is a zoom command as in step 1005, the same automatic cropping action can also be applied as in step 1006. The effect of such an operation is illustrated by documentation element 1007 in which the image of the design element has been zoomed to a high magnification level and has been automatically cropped. Alternatively, the image of the design element can be automatically zoomed if the image adjustment command would otherwise move a portion of the image of the design element outside of the area defined by the borders of the documentation element. Such an action could be conducted in step 1008 in which the image adjustment command received in step 1002 would have otherwise panned the image outside of the area to the left. The effect of the automatic zoom on the image of the design element is illustrated by documentation element 1009 in which the image of the design element has been automatically zoomed to a lower level of magnification so that it remains entirely within the border of the documentation element despite being panned.

FIG. 10 illustrates another feature of how the documentation elements can respond to image adjustment commands. If a representation is automatically cropped, a border style can be applied to a portion of the border that crops the image of the design element. The border style will be such that it indicates to a user that the portion of the border in question cropped the image. For example, the border could appear as a jagged edge as in documentation elements 1004 and 1007. However, something as basic as a color change in the style of the border could communicate the same information to someone viewing the documentation element. In addition, an icon could instead be displayed along with the documentation element to indicate that a portion of the image of the design element was not within the border of the documentation element. For example, a closed or half-open eye icon displayed in a corner of the documentation element could indicate that the image had been cropped.

Although not shown in FIG. 10, the adjustment of the representation of the design element within the documentation element can have a similar effect to an adjustment of the size of the documentation element itself. If the documentation element were made larger or smaller, the relationship between the area afforded to the image of the design element and the size of the design element would be altered in similar fashion to a command that alters the size or position of the image of the design element. Therefore, the documentation element can respond to these commands in a similar fashion. For example, the image could be zoomed in lock step with the resizing of the documentation element or it could be automatically cropped. The stylized borders that indicate the image was cropped could be applied automatically in response to such a command.

Figure 11:
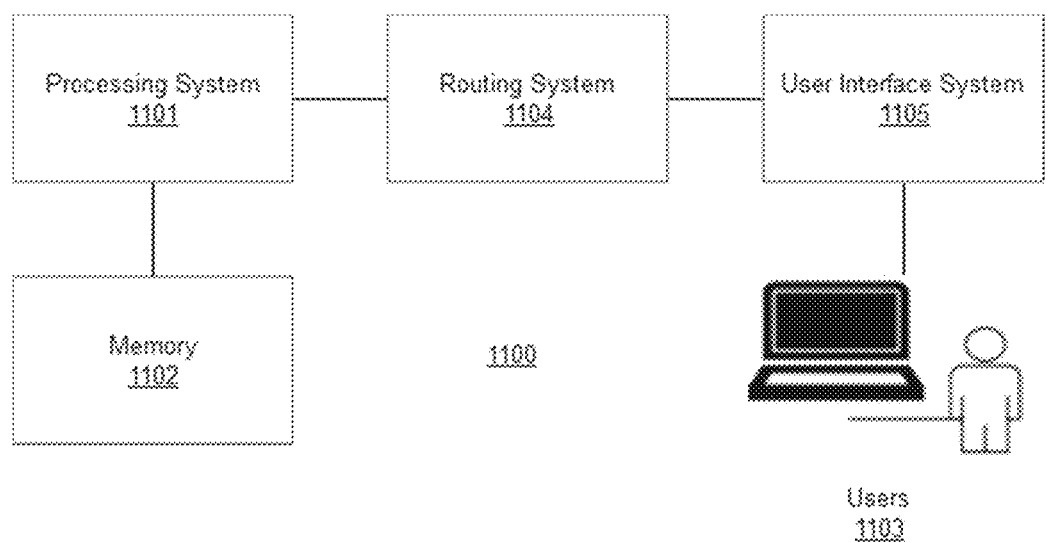
FIG. 11 illustrates a computer system that can be used to execute the methods described herein and instantiate the systems described herein.

Any of the methods described herein can be conducted through the use of a computer system 1100 as shown in FIG. 11. For example, the design environment could be provided by a processing system 1101 acting in tandem with a memory 1102. A user 1103 would be able to access the design environment through the use of a routing system 1104 and a user interface system 1105. Any method steps involving providing or accepting things to and from a user can be conducted using interface system 1105. Any method steps involving executing an action can be conducted using processing system 1101 alone or in combination with memory 1102. FIG. 11 is only an illustrative computer system that is amenable to operation in accordance with embodiments of the present invention and variant computer system topologies may be used in its stead. Nothing in this description should limit the processor of processing system 1101 to a single processor, as the function of this block can be accomplished by multiple physical processors located either on a single work station or server, or distributed through a network. It is not essential for memory 1102 to be physically distinguishable from processing system 1101, as they are merely illustrated as separate blocks for purposes of invoking common conceptions of how computing systems operate. Routing system 1104 could be the internal routing system of a single work station, a LAN, a WAN, a wired or wireless network, the Internet, or any other system capable of routing signals. User interface system 1105 could be a work station, a computer, a mobile phone or other mobile device, or any computing device or group of computing devices capable of receiving inputs from a single user or group of users. FIG. 11 should also not be taken to indicate that the invention can only involve design environments or design programs that may only be accessed by one user as there could be multiple users 1103 and that group of multiple users 1103 could access the design environment using any number of routing systems 1104. Those users could also access the design environment simultaneously.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A computer-implemented method, wherein each step is conducted using a processor and a memory, the method comprising:
   receiving a documentation element addition command to add a documentation element to a documentation for an interactive graphical design, wherein the documentation and the interactive graphical design are both instantiated in a graphical design environment, and wherein the documentation element addition command is conducted via a drag-and-drop between a tool bar and a design window of the graphical design environment;
   receiving a design element selection command to select a design element, wherein the design element is displayed in the interactive graphical design in the graphical design environment, and wherein the design element has been preprogrammed to display a plurality of states when the interactive graphical design is rendered in a player;
   linking the documentation element and the design element such that the documentation element displays a representation of the design element, wherein the representation of the design element is an image of the design element;
   receiving a configuration of an action in a documentation element state display interface in the graphical design environment, wherein the action includes at least one event handler, wherein execution of the action when the interactive graphical design is rendered in the player places the design element in a state from the plurality of states; and
   displaying, after receiving the configuration of the action in the documentation element state display interface, the representation of the design element in the state, wherein the representation of the design element is placed in the state by applying the action.

2. The method of claim 1, further comprising:
   receiving an image adjustment command from the user, via an image adjustment interface, to adjust a relative location of the representation of the design element within an area defined by the documentation element; and
   cropping the representation of the design element if the image adjustment command moves a portion of the representation of the design element outside of the area defined by the documentation element.

3. The method of claim 1, further comprising:
   receiving a modification for the design element after the design element and the documentation element are linked; and
   automatically altering the representation of the design element to reflect the modification.

4. The method of claim 1, further comprising:
   deriving a set of actions that place the design element in each of a plurality of states when executed; and
   presenting the set of actions to the user, via the documentation element state display interface, after deriving the plurality of actions, wherein the receiving the action step is conducted via a selection of one of the set of actions in the documentation element state display interface.

5. A non-transitory computer-readable medium having stored thereon instructions configured to be executed by a processor to provide an interactive graphical design environment, the instructions comprising:
   initiating a documentation within the interactive graphical design environment;
   receiving a documentation element addition command to add a documentation element to the initiated documentation within the interactive graphical design environment, wherein the documentation element is added to the documentation via a drag-and-drop operation between a toolbar and a design window of the interactive graphical design environment, wherein the documentation element is executed by the processor operating in combination with the non-transitory computer-readable medium;
   initiating an interactive graphical design within the interactive graphical design environment;
   receiving a design element selection command to select a design element to be displayed in the initiated interactive graphical design within the interactive graphical design environment, wherein the design element in the interactive graphical design that has been preprogrammed to display a plurality of states when the interactive graphical design is rendered in an external player, wherein the design element is executed by the processor operating in combination with the non-transitory computer-readable medium;
   linking the documentation element and the design element such that the documentation element displays a representation of the design element, wherein the documentation element captures information regarding the design element and provides a representation of the design element based on that information, wherein the representation of the design element is an image of the design element;
   receiving a configuration of an action in a documentation element state display interface in the interactive graphical design environment, wherein the action includes at least one event handler, wherein execution of the action when the interactive graphical design is rendered in the player places the design element in a state from the plurality of states; and
   displaying, after receiving the configuration of the action in the documentation element state display interface, the representation of the design element in the state, wherein the representation of the design element is placed in the state by applying the action.

6. The non-transitory computer readable medium of claim 5, wherein the instructions stored in the non-transitory computer-readable medium and configured to be executed by the processor further comprising:
receiving a plurality of image adjustment commands from a user on an image adjustment interface, wherein the plurality of image adjustment commands includes pan and zoom the representation of the design element.

7. The non-transitory computer readable medium of claim 6, wherein the instructions stored in the non-transitory computer-readable medium and configured to be executed by the processor further comprising:
identifying an area surrounded by a border in the documentation element; and
automatically cropping the image of the design element when the image adjustment commands move a portion of the representation of the design element outside of the area.

8. The non-transitory computer readable medium of claim 7, wherein the instructions stored in the non-transitory computer-readable medium and configured to be executed by the processor further comprising:
applying a border style to a portion of the border that crops the image of the design element when the representation of the design element is automatically cropped, wherein the border style distinguishes the portion of the border from a remainder of the border.

9. The non-transitory computer readable medium of claim 5, wherein the instructions stored in the non-transitory computer-readable medium and configured to be executed by the processor further comprising:
linking the design element and the documentation element; and
altering, by the interactive graphical design environment, the representation of the design element displayed in the documentation element in order to reflect a received modification from the user to the design element displayed in the interactive graphical design: (i) when the documentation element is loaded into a memory; and (ii) after the design element and the documentation element are linked.

10. The non-transitory computer readable medium of claim 5, wherein the instructions stored in the non-transitory computer-readable medium and configured to be executed by the processor further comprising:
linking the design element and the documentation element; and
automatically altering, by the interactive graphical design environment, the representation of the design element displayed in the documentation element to reflect a received modification from the user to the design element displayed in the interactive graphical design in response to linking the design element and the documentation element.

11. The non-transitory computer readable medium of claim 10, wherein the instructions stored in the non-transitory computer-readable medium and configured to be executed by the processor further comprising:
presenting the representation of the design element in the documentation element and the design element in the interactive graphical design to the user via a pointer to a common location in data.

12. The non-transitory computer readable medium of claim 5, wherein the instructions stored in the non-transitory computer-readable medium and configured to be executed by the processor further comprising:
receiving a first modification to the representation of the design element that is directly entered by the user through the documentation element;
modifying, by the interactive graphical design environment, the representation of the design element to reflect a second modification to the design element that is received from the user through the interactive design environment; and
modifying the representation of the design element displayed in the documentation element to reflect the second modification when the second modification does not conflict with the first modification.

13. The non-transitory computer readable medium of claim 5, wherein the instructions stored in the non-transitory computer-readable medium and configured to be executed by the processor further comprising:
defining the plurality of states of the design element based on a set of events and event handlers; and
presenting the plurality of states of the design element based on a set of events and event handlers to the user through the documentation element state display interface.

14. The non-transitory computer readable medium of claim 5, wherein the instructions stored in the non-transitory computer-readable medium and configured to be executed by the processor further comprising:
deriving, by the processor, a set of actions that places the design element in each of the plurality of states, wherein the derived set of actions includes the action; and
presenting the set of actions that places the design element in each of the plurality of states in the documentation element state display interface to the user for selection.

15. A non-transitory computer-readable medium storing instructions and configured to be executed by a processor to execute a documentation tool within an interactive graphical design environment, the instructions comprising:
initiating, by the processor, a documentation generator interface within an interactive graphical design environment that allows a user to generate documentation for a design element in an interactive graphical design;
receiving a documentation element addition command to add a documentation element to the initiated documentation generator interface within the interactive graphical design environment, wherein the documentation element is added to the documentation generator interface via a drag-and-drop operation between a toolbar and a design window of the interactive graphical design environment, wherein the documentation generator interface is executed by the processor operating in combination with the non-transitory computer-readable medium;
initiating, by the processor, an interactive graphical design within the interactive graphical design environment;
receiving a design element selection command to select a design element to be displayed in the initiated interactive graphical design within the interactive graphical design environment, wherein the design element in the interactive graphical design has been preprogrammed to display a plurality of states when the interactive graphical design is rendered in an external player;
linking the documentation element and the design element through a link manager component such that the documentation element displays a representation of the design element, wherein the representation of the design element is an image of the design element, wherein the link manager component applies a modification made by the user to the design element displayed within the interactive graphical design to the representation of the design element displayed in the documentation generator interface, and wherein the link manager component is executed by the processor operating in combination with the non-transitory computer-readable medium;

receiving a configuration of an action in a documentation element state display interface in the interactive graphical design environment, wherein the action includes at least one event handler, wherein execution of the action when the interactive graphical design is rendered in the player places the design element in a state from the plurality of states; and displaying, after receiving the configuration of the action in the documentation element state display interface, the representation of the design element in the state, wherein the representation of the design element is placed in the state by applying the action.

16. The non-transitory computer-readable medium of claim 15, wherein the instructions stored in the non-transitory computer-readable medium and configured to be executed by the processor further comprising:

receiving a user input to activate a capture button displayed in the interactive graphical design environment to configure the interactive graphical design environment into a capture mode;

receiving the design element selection command from the user to provide a selection operation to the design element during the interactive graphical design environment is in the capture mode;

automatically generating a new documentation element in response to receiving the design element selection operation during the interactive graphical design environment is in the capture mode;

storing the generated new documentation element in an exportable format; and presenting to the user the new documentation element for review outside of the interactive graphical design environment.

17. The non-transitory computer-readable medium of claim 15, wherein the instructions stored in the non-transitory computer-readable medium and configured to be executed by the processor further comprising:

receiving a user input to activate a capture button displayed in the interactive graphical design environment to configure the interactive graphical design environment into a capture mode; and receiving the design element selection command from the user to capture a selection operation of the design element during the interactive graphical design environment is in the capture mode, wherein the capture of the selection operation of the design element includes deriving a set of actions that places the design element in each of the plurality of states.

* * * * *